United States Patent
O'Sullivan et al.

(10) Patent No.: US 9,444,705 B2
(45) Date of Patent: Sep. 13, 2016

(54) BRINGING ATTENTION TO AN ACTIVITY

(71) Applicant: International Business Machines Corporation, Armonk, NY (US)

(72) Inventors: Patrick J. O'Sullivan, Ballsbridge (IE); Jeffrey B. Sloyer, Cary, NC (US); Edith H. Stern, Yorktown Heights, NY (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 14/254,738

(22) Filed: Apr. 16, 2014

(65) Prior Publication Data
US 2015/0304186 A1 Oct. 22, 2015

(51) Int. Cl.
G06F 3/048 (2013.01)
H04L 12/26 (2006.01)
G06F 17/30 (2006.01)
H04L 29/08 (2006.01)

(52) U.S. Cl.
CPC ......... H04L 43/08 (2013.01); G06F 17/30312 (2013.01); H04L 67/02 (2013.01); H04L 67/22 (2013.01); H04L 67/306 (2013.01)

(58) Field of Classification Search
CPC ................................................ G06F 17/30312
USPC ........................................................ 715/854
See application file for complete search history.

(56) References Cited

U.S. PATENT DOCUMENTS

| | | | |
|---|---|---|---|
| 7,912,755 B2 | 3/2011 | Perry et al. | |
| 8,438,080 B1 | 5/2013 | Xiao et al. | |
| 8,442,978 B2 * | 5/2013 | Berkhim | G06F 17/30616 707/732 |
| 9,081,808 B1 * | 7/2015 | Kiveris | G06Q 30/0251 |
| 2009/0083211 A1 | 3/2009 | Sinha et al. | |
| 2013/0205232 A1 * | 8/2013 | Vandermolen | G06F 17/30867 715/760 |
| 2014/0195544 A1 * | 7/2014 | Whitman | G06Q 30/02 707/744 |
| 2014/0278986 A1 * | 9/2014 | Rouse | G06Q 30/0256 705/14.54 |
| 2014/0310281 A1 * | 10/2014 | Somekh | G06F 17/30312 707/737 |
| 2015/0278278 A1 * | 10/2015 | Keim | G06F 17/30345 707/741 |
| 2015/0304178 A1 | 10/2015 | O'Sullivan et al. | |
| 2015/0304186 A1 | 10/2015 | O'Sullivan et al. | |

OTHER PUBLICATIONS

List of IBM Patents or Patent Applications Treated as Related dated Nov. 10, 2015, 2 pages.

* cited by examiner

*Primary Examiner* — William Titcomb
(74) *Attorney, Agent, or Firm* — Scully, Scott, Murphy & Presser, P.C.; Dermott Cooke

(57) ABSTRACT

An activity associated with a digital medium may be detected. An interest of a user may be identified responsive to detecting the activity. The interest may be stored, and one or more on-line communities monitored for the interest to find content associated with the interest. The user may be notified of the content in a scalable manner to keep the user up-to-date with the interest.

13 Claims, 3 Drawing Sheets

BRINGING ATTENTION TO AN ACTIVITY

FIELD

The present application relates generally to computers, and computer applications, and more particularly to bringing attention to an activity.

BACKGROUND

Current email systems and collaboration systems inundate users with large amount of content. The vast amount of data presented to users sometimes causes the users to miss content that they actually need to pay attention too. Conversely, faced with huge amount of data, it can be problematic to find content that is relevant to what the user is looking for.

A fundamental challenge to the plurality of teamrooms, activities, wikis, communities, blogs, content repositories, and the like, is that frequently there can be more content sources associated with an individual than the individual can possibly absorb. Likewise, at the point in time where aspects of these data sets may be relevant, the user may be unable discern the "what" from "where" at a given point in time where needed. This is the classic case of information overload with the challenge of point in time context.

BRIEF SUMMARY

A method of bringing an attention to an activity, in one aspect, may comprise detecting the activity, the activity associated with a digital medium and performed via one or more on-line information sources. The method may also comprise identifying an interest of a user responsive to detecting the activity. The method may further comprise storing the interest. The method may also comprise monitoring one or more on-line information sources for the interest to find content associated with the interest. The method may also comprise notifying the user of the content to keep the user up-to-date with the interest.

A system bringing an attention to an activity, in one aspect, may comprise one or more processors and a memory device. The one or more processors may be operable to detect the activity, the activity associated with a digital medium and performed via one or more on-line information sources. The one or more processors may be further operable to identify an interest of a user responsive to detecting the activity and store the activity on the memory device. The one or more processors may be further operable to monitor one or more on-line information sources for the interest to find content associated with the interest. The one or more processors may be also operable to notify the user of the content to keep the user up-to-date with the interest.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
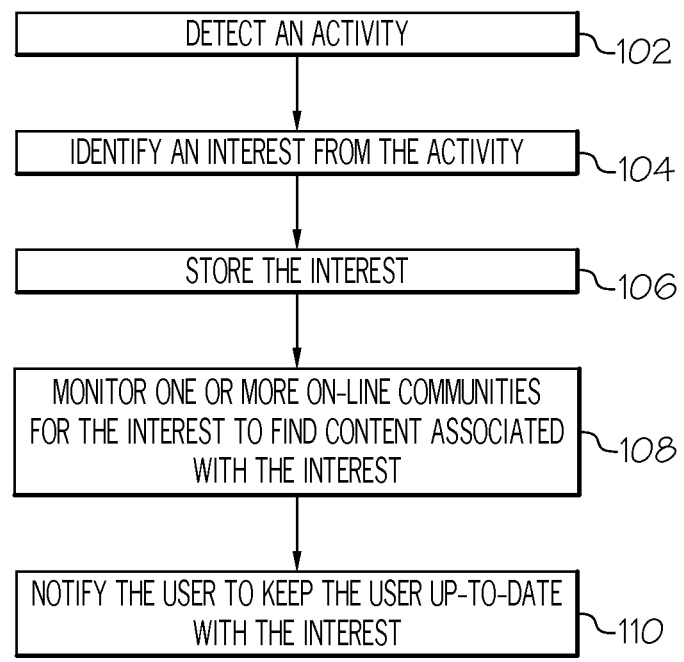
FIG. 1 is a flow diagram illustrating a method of the present disclosure in one embodiment.

An aspect of the present disclosure in one embodiment may discern relevant content from the large amount of data that is available to the user, narrowing down content and providing other relevant content based upon what the user is looking for, in particular context or point in time.

An aspect of the present disclosure in one embodiment may provide for the ability to identify content that is related to a particular context. A methodology may be presented for analyzing a medium and providing other related relevant content related to the context of the medium. More specifically, the methodology of the present disclosure in one embodiment may surface (present or bring attention to the user) content that is relevant against the conduits (applications) where it is likely relevant, and to surface the potential relevance as tags in the content or pointers to the content.

In the present disclosure in one embodiment information sources (e.g., multiple information sources) may be utilized, e.g., accessed and searched for identifying a user activity with respect to a particular medium and uncovering and surfacing related content in the context of the medium. Information sources may include all information available or a set of information. Examples of information sources may include, but are not limited to, information associated with the user such as communities the user belongs to, team rooms the user has access to, user's e-mail account, and/or others. The places and frequency to search may be configurable, e.g., set by the user, set by an administrator, defined by rules or policies, or one or more combinations thereof, but is not limited to these.

Such information sources may be accessed and/or searched in the present disclosure as one or more sources used to determine the interest (possibly including user input), one or more sources that are searched (inspected) for relevant information associated with the interest, and as a way the relevant information is presented to the user.

A simple example is a user reading an email related to a customer relationship management (CRM) opportunity. The email may include tags or hooks (e.g., appended to the body of the email) that surface (or present) links to content data sets that may be relevant to this opportunity across a plurality of teamrooms (application that creates an on-line place where team members can store documents, share information, and collaborate with one another), activities, wikis, communities, blogs, content repositories that may store relevant content.

An embodiment of the present disclosure may detect an interest from an activity of a user, e.g., reading of email, find content related to that interest and keep the user up to date with the interest, e.g., via situational cues to facilitate surfacing or presenting this in context if desired by the user.

In one aspect, the methodology of the present disclosure may be pre-emptive, e.g., as emails are received, a component of the present disclosure in one embodiment, e.g., a data analyses engine may be continually looking for and pre-empting the related content, to situationally surface tags that may be related to the email, and keeping this up to date as the remote content changes.

In another aspect, the methodology of the present disclosure may provide the situational priming of content, such that "relevant content finds the user," different from the user having to find the content, where the situational priming is pre-emptive and automated on behalf of the user.

FIG. 1 is a flow diagram illustrating a method of the present disclosure in one embodiment. At 102, an activity of a user on a digital medium (an example of information source) may be detected, for example, by one or more processors. The digital medium may comprise one or more of digital file, an electronic mail (e-mail) or another digital communication form, a digital posting, an on-line blog, an on-line social community, an electronic message, an electronic calendar, or other digital medium that a user acts on, or combinations thereof, but not limited to those examples.

At 104, an interest of a user is identified responsive to detecting the activity. The method, e.g., may identify content (e.g., from one or more of information sources) that is related to the activity and aspects of the digital medium. For example a user is reading an email from the user's management on a topic and there may be a plurality of tags in the email that link to a community forum or discussion on that topic. At that point in time, the user can decide to read those topics by additionally clicking on the tags. In the present disclosure, the intent of reading an email (e.g., opening the email) and taking an action on that email, e.g., either reading it or clicking on a link to a community registers the user's interest in those topics.

Consider also an electronic calendar as an example of information source used in the present disclosure. In this context, an example of an activity may be a user opening an electronic calendar invite (e.g., invitation for a meeting), and keywords/topics can be extracted from the invite.

Identifying one or more specific interest from the digital medium activity may utilize any know techniques such as topic discovery, natural language processing, search and search engine techniques, Question Answering (QA) techniques, techniques that analyze/process text, etc.

At 106, the interest may be stored, e.g., on a memory device or storage device, for one or more processors to access. The event (e.g., the detected activity) may be also stored. Interest may be stored in form or data structure of a template. For instance, there may be a template associated with an interest, the template comprising a plurality of attributes associated with that interest.

At 108, one or more information sources, e.g., on-line communities, may be monitored for the interest to find content associated with the interest. The monitoring may be performed in an on-going manner. Data corresponding to the plurality of attributes of the template associated with the interest may be identified from the content and populated in the template. For example, referring to the e-mail reading example, once an interest is stored, the methodology of the present disclosure in one embodiment may monitor one or more communities on the interest (topic), and if another user posts an item on that topic or community, the user may be notified since it is an ongoing interest.

For instance, take the calendar invite as an example activity. Once the interest or topics of interest are extracted from the detected activity, the method may search through one or more information sources, e.g., on-line communities and/or on-line social networks, and find communities one or more information sources, e.g., that have an intersection between the invitees from the calendar invite and communities that are tagged or have related content to the calendar invite. The method in one embodiment of the present disclosure may provide links to the found content or a link to the information sources, communities that are associated with the topic of the meeting.

At 110, the user is notified of the content to keep the user up-to-date with the interest. The notifying may be performed in an on-going manner. The notifying may comprise presenting a subset of the content to the user by presenting the data populated in the template. In one aspect, the attributes of the template represent information associated with the interest determined to be relevant to the user.

In another aspect, a filtering methodology may be implemented in a high volume on-line community or on-line social network, where if large pieces of content get posted, the methodology may present the top 3% for example in a community. Top content may be determined by interest or amount of downloads.

The present disclosure in one embodiment provides a methodology for joining data to a person where it is relevant, e.g., even as the data is changing. For instance, information the user viewed at an on-line community in the morning could be different in the evening of the same day. The methodology of the present disclosure in one embodiment may consider the changing data and acknowledge that a user may want a live stream to that data. In one aspect, the methodology of the present disclosure may also alert the user that content has changed in a community they are interested in via directly in the digital medium or through another form of alerting a user. In another aspect, the methodology may provide a live stream of data that the user is interested in that is built around the registered interest. This river or live stream may be built using an algorithm that determines how many related topics or documents there are that requires the user's attention. Built real time, the stream could be different daily, e.g., from 3 days out to 1 day out. Additionally, the stream may be built based on how many documents or items of content there are, e.g., 2 or 3 days out stream could only have 5 documents while 1 day out it could have only 1 document for review for an upcoming meeting or event.

Referring to 106 in FIG. 1, if a template associated with the identified interest is found, the one or more processors attempts to find values for the attributes from the information sources available, e.g., by monitoring the on-line communities at 108. Monitoring at 108, e.g., may comprise monitoring information sources, e.g., one or more of team rooms, shared file stores of a community, e-mails, searching all or subset of one or more corporate, government, personal, public or private information sources. In the present disclosure in one embodiment, the search or monitoring method is not limited. Such monitoring or searching may include database lookups, e.g., relational table look ups, question-answering technology, search engine techniques, or any other techniques.

Figure 2:
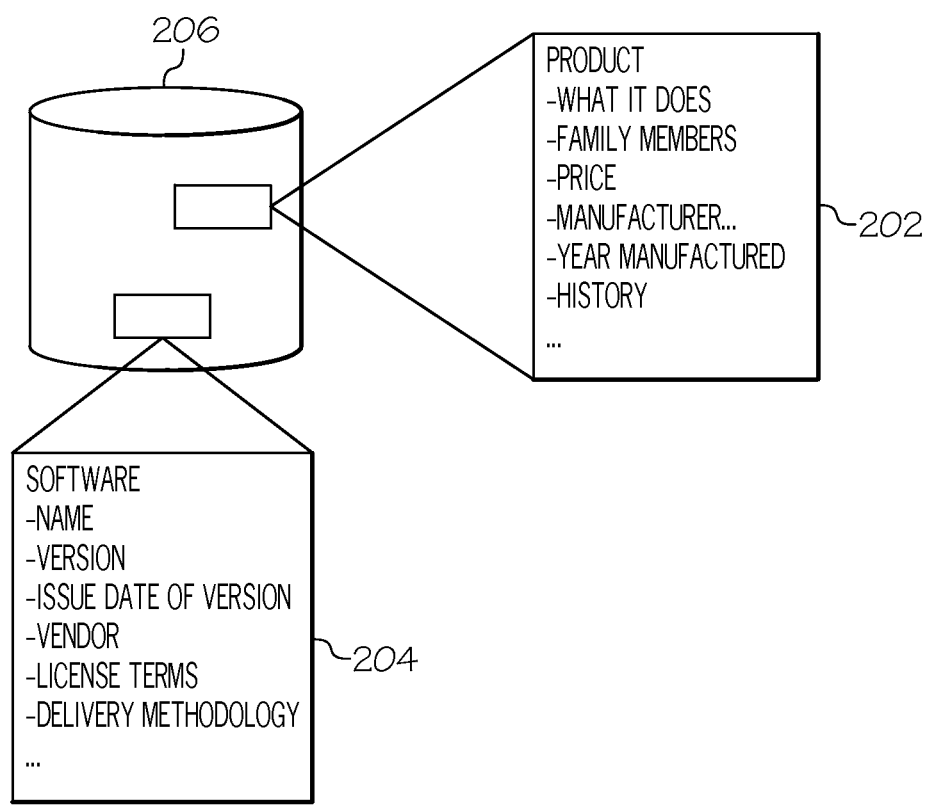
FIG. 2 shows such examples of templates in one embodiment of the present disclosure.

In one embodiment of the present disclosure, e.g., as described with respect to 106 in FIG. 1, for a type of item or activity of interest there may be a template of characteristics. For example, with a product there may be the template Product and associated attributes such as what it does, family members (what sizes, colors, etc.), prices, manufactures and locations and major ingredients or components, years manufactured, history. FIG. 2 shows such examples of templates in one embodiment of the present disclosure. The templates 202, 204 may be stored on a memory device or a storage device 206, e.g., in a database of templates, for one or more processors to retrieve and process. In one aspect, the templates with their attributes provide a filtered version of the content that is found associated with the identified interest.

The database of templates, e.g., stored in a storage device 206 may be a formal relational database such as DB2, a No SQL database, a file system, a content management system, or any method of persistently storing the templates. The database is readable and in some embodiments can be added to (insert an item), updated or changed. The database of templates may be stored in relational format, extensible markup language (XML), javascript object notation (JSON Notation), Key Value pairs, or other format. A template has a set of topics, these topics have attributes. In some embodiments the attributes can themselves be topics with attributes of their own. This can be recursive to any desired level.

Attributes are data that the builder of the template has chosen as potentially of interest to a user interested in the topic. As an example, the choice of attributes may be determined based on user input and/or by discovering or learning automatically based on one or more information source the aspects of user's interests. The following illustrates some additional examples of templates:

Topic: Software Product
Attribute: Name
Attribute: Version Number
Attribute: Issue Date of Version
Attribute: Vendor
Attribute: License Terms
Attribute: Delivery Methodology
Attribute: Market Penetration
Attribute: Competition
Topic: Governor
Attribute: Name
Attribute: State
Attribute: Years of Service
Attribute: Political Party
Attribute: Accomplishments
Attribute: Significant newsworthy events
Attribute: Biography (which in turn may have attributes)
Topic: Biography
Attribute: Name
Attribute: Birthdate
Attribute: Siblings
Attribute: Parents
Attribute: Home town
Attribute: Education
Attribute: Career
Attribute: Medical History A topic of interest and associated user may be identified to the system. This may be from an explicit assertion by the user "I am interested in this topic", or inferred from e-mail, instant message, calendar entries, membership in an on-line community, searches on the World Wide Web or the Internet, etc. Responsive to identifying the topic data base is queried for a template. If the template is found, the methodology of the present disclosure in one embodiment attempts to find values for the attributes from the information sources available. As described above, the information sources may include, but not limited to, team rooms or shared file stores of a community, e-mails, search of all or subset of one or more corporate, government, personal, public or private information sources. The search method is not limited. Thus, an instance of a template with information filled in may be associated with a particular user.

The topic and attributes are communicated to the user. The user may be allowed to modify the template to improve its match to the user's interest. The modification of the template may be also performed on behalf of a community, social network, department, organization, or any group wishing and having access to do so. For instance, one or more collaborative tools, such as work flow with approval to modify the template, may be provided.

The user may be also allowed to modify the output format to improve its match to the user's communication style. This could involve color, pictures, video, progress revelation of information, fly-overs and drill down in depth. The modification of the output may be also performed on behalf of a community, social network, department, organization, or any group wishing and having access to do so. For instance, one or more collaborative tools, such as work flow with approval to modify the output/output format, may be provided.

Referring to 108, for example, in response to identifying an interest from the activity, e.g., that a user is interested in a particular product, the template (template's attributes) is populated with information discovered or found through queries against information sources, e.g., community knowledge (e.g., on-line social communities, Internet, and other knowledge universe). If there are multiple sources of information that conflict with one another, that information may be noted and stored as well.

In this manner, the user does not have to wade through a perhaps very large list of documents but instead can look at the "filled in" template. Further the template, embodying the expertise of others may bring forward important information that the user might not have thought of asking for.

Using the template to present the information to the user also allows the user to uncover a set of important characteristics about the interest. For example, the user need not have to "re-invent" the set of important characteristics and query for them separately. Using the template with its attributes, they are queried for collectively and response displayed in an integrated way.

In one embodiment of the present disclosure, the template may be pre-defined, e.g., composed by one or more experts, or customized by a given individual, group or community. In another aspect, the template may be built dynamically and automatically. For instance, at 106 in FIG. 1, if a template associated with the particular interest that is identified is not found, a new template may be built. To define attributes of such new template, a user may be queried and/or on-line source may be queried.

In one embodiment of the present disclosure, a template building tool may be provided and utilized. The template building tool is tool one or more people can use to define the attributes of the template. The tool may also have access to on-line information. For example a user or an automated method building a template for "Automobile" might perform a search on "Stingray" on the internet (or another source, e.g.) and analyze an article to determine what attributes of the "Stingray" are described in the article. Such tool may contain a workflow or other means of crowd sourcing or customizing. A results visualization tool may be provided that allows building and customizing the response. The results visualization tool may be a tool to describe how the "filled in" attributes are presented to the end user. They may all be presented as text, some may be presented as pictures or videos, music as appropriate. The visual, auditory, temporal presentation of possibly these and other representations of the template attributes (and/or the order of presentation) are defined by the "visualization description." This visualization description may be built using the results visualization tool.

In the present disclosure, in one embodiment, content finds a user who might need that content. For example, without the user having to query for specific information or designate specific interest, a methodology of the present disclosure automatically identifies an interest and content associated with the interest. The content is filtered automatically with only the information that is determined to be relevant to the user. For instance, through the use of the templates, the methodology in one embodiment of the present disclosure understands what aspects of an "item" relevant to the user might be interesting to the user. It then gathers these aspects together, e.g., across one or many pieces of source content and presents them to the user in a manner easy to comprehend. Thus, in one aspect, the user is unburdened from having to extract the interesting items from content that is received.

In the present disclosure, content can be identified and related to a particular medium. A methodology in one embodiment may determine whether there are enough markers or keywords in a piece of content, make an educated guess and decide on the information a user needs to look at. The methodology in one embodiment may utilize a learning system such as a question-answering system, and learn the patterns and behaviors of a person to make better educated guesses. The methodology in one embodiment of the present disclosure may continuously refine the information it suggests around a piece of content, and the piece of content could be updated on regular intervals when a community changes.

Although email is provided as an example where a methodology of the present disclosure is applicable, the methodology can be applied to many other digital or on-line medium/forms, e.g., CRM opportunities, activity entries, community entries, etc. Those forms represent places where situational priming of related content can take place, and where such priming is user-specific (e.g., there is different answer for each user), e.g., on the basis that users have access to different content, different access controls, etc. Hence, the situational priming that is relevant to one user can and may oftentimes be different for another user.

The present disclosure as described above in one aspect provides for detecting an interest, finding content related to that interest and keeping the user up-to-date with the interest. A method in one aspect thus may provide information based on a context. For example, responsive to receiving an artifact associated with a user, the method may analyze the artifact for a topic of interest to the user, identifying associations for the topic of interest based on a context for the user, monitor a corpus of data for the associations, and responsive to identifying a subset of data exceeding a predicted expected interest of the user based on the context, present the subset of data. Examples of the artifact may include a computer-storable, readable file, a document, an email, a posting, a blog, a social community, a search string, an instant message, a short message service (SMS), and etc. The associations may be attributes associated with the topic. Examples of the corpus of data may include team rooms, shared file stores of a community, e-mails, libraries, corporate, public, personal, private, blogs, government, etc. The associations may be retrieved as a template. The template may be stored in a repository comprising, e.g., a database, a file system, a content management system, a server, a community, emails, etc. The template may be stored in a format comprising, e.g., one or more of relational database (table, record), extensible markup language (XML), javascript object notation (JSON), key value pair, etc. In another aspect, a computer-implemented user interface (UI) or the like may be provided that allow a user to select, modify, refine, specify, and identify templates, criteria, the corpus of data, and rules to associate the topic of interest with the context. Responsive to the user utilizing the UI and making selections, information may be presented based on a ranking according to the rules. Technique such as natural language processing (NLP) may be utilized to identify the topic of interest. Techniques including analytic analysis may be applied to a history of selections by the user. Techniques such as artificial intelligent (AI) and/or machine learning with feedback from the user may be utilized to adjust the rules.

Figure 3:
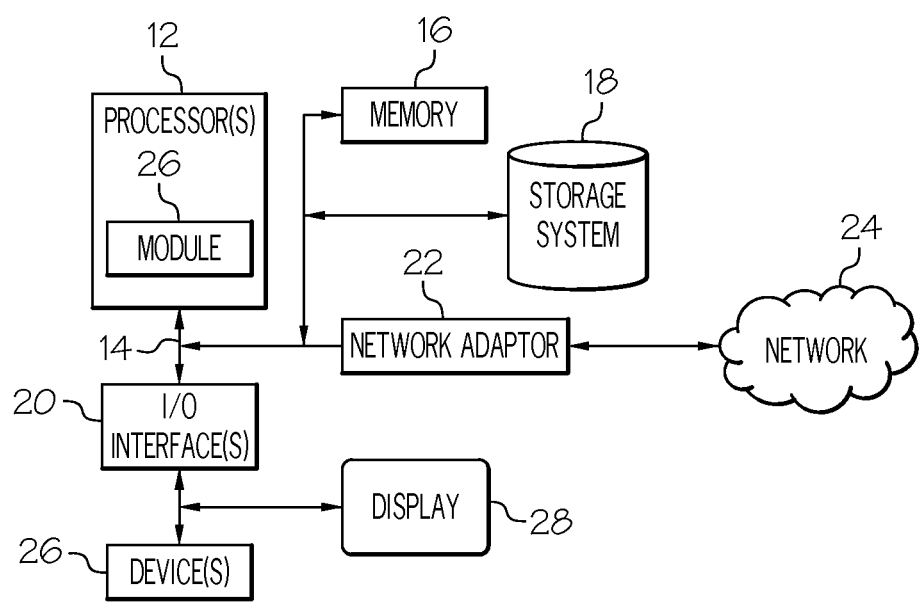
FIG. 3 illustrates a schematic of an example computer or processing system that may implement a system in one embodiment of the present disclosure.

FIG. 3 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage medium storing a program of instructions executable by a machine to perform a method of bringing an attention to an activity, the method comprising:
   detecting the activity performed on a processor and performed via an on-line information source, the activity associated with a computer artifact;
   identifying an interest of a user responsive to detecting the activity by performing at least a computer-implemented natural language processing technique to automatically extract the interest based on the activity;
   storing the interest;
   monitoring one or more on-line communities for the interest to find content associated with the interest; and
   notifying the user of the content to keep the user up-to-date with the interest, the notifying comprising presenting a filtered set of content to the user and alerting the user via the computer artifact on which the activity has been detected that content associated with the interest has changed.

2. The computer readable storage medium of claim 1, wherein the monitoring and the notifying are performed in an on-going manner.

3. The computer readable storage medium of claim 1, wherein the storing of the interest comprises populating a template associated with the interest, the template comprising a plurality of attributes associated with the interest, the plurality of attributes representing a selected set of characteristics associated with the interest, wherein the filtered set of content presented to the user comprises the select set of characteristics associated with the interest found in the content.

4. The computer readable storage medium of claim 3, wherein data corresponding to the plurality of attributes is identified from the content and populated in the template.

5. The computer readable storage medium of claim 4, wherein the notifying comprises presenting a subset of the content to the user by presenting the data populated in the template.

6. The computer readable storage medium of claim 5, wherein the attributes represent information associated with the interest determined to be relevant to the user.

7. The computer readable storage medium of claim 1, wherein the computer artifact comprises at least one artifact selected from a group consisting of: a digital file, an electronic mail, a digital posting, an on-line blog, an on-line social community, an electronic message, an electronic calendar, and other computer artifact that a user acts on.

8. A system bringing an attention to an activity, comprising:
   at least one processor; and
   a memory device;
   the at least one processor operable to detect the activity performed on the at least one processor, the activity associated with a computer artifact and performed via at least one on-line information source;
   the at least one processor further operable to identify an interest of a user responsive to detecting the activity by performing at least a computer-implemented natural language processing technique to automatically extract the interest based on the activity, and store the activity on the memory device;
   the at least one processor operable to monitor said at least one on-line information sources for the interest to find content associated with the interest; and
   the at least one processor operable to notify the user of the content to keep the user up-to-date with the interest, the at least one processor presenting a filtered set of content to the user and alerting the user via the computer artifact on which the activity has been detected that content associated with the interest has changed.

9. The system of claim 8, wherein the at least one processors stores the interest by populating a template associated with the interest, the template comprising a plurality of attributes associated with the interest, the plurality of attributes representing a selected set of characteristics associated with the interest, wherein the filtered set of content presented to the user comprises the select set of characteristics associated with the interest found in the content.

10. The system of claim 9, wherein data corresponding to the plurality of attributes is identified from the content and populated in the template.

11. The system of claim 10, wherein the at least one processor notifies the user by presenting a subset of the content to the user by presenting the data populated in the template.

12. The system of claim 11, wherein the attributes represent information associated with the interest determined to be relevant to the user.

13. The system of claim 8, wherein the computer artifact comprises at least one artifact selected from the group consisting of: a digital file, an electronic mail, a digital posting, an on-line blog, an on-line social community, an electronic message, an electronic calendar, and other computer artifact that a user acts on.

\* \* \* \* \*